(12) United States Patent
Hung et al.

(10) Patent No.: US 7,462,029 B1
(45) Date of Patent: Dec. 9, 2008

(54) UNIFORM PRESSING APPARATUS FOR USE IN A MICRO-NANO IMPRINT PROCESS

(76) Inventors: Jung-Chung Hung, No. 385, Yung-Ping Road, Nan Tun District, Taichung City (TW); Ching-Hua Hung, 16F-1, No. 25, Chien-Chung 1st Road, Hsinchu City (TW)

( * ) Notice: Subject to any disclaimer, the term of this patent is extended or adjusted under 35 U.S.C. 154(b) by 0 days.

(21) Appl. No.: 11/876,648

(22) Filed: Oct. 22, 2007

(51) Int. Cl.
*B29C 59/00* (2006.01)

(52) U.S. Cl. .................. 425/385; 425/405.1; 425/387.1; 425/DIG. 19; 264/293

(58) Field of Classification Search ................. 425/385, 425/387.1, 405.1, DIG. 19; 264/293; 100/269.1
See application file for complete search history.

(56) References Cited

U.S. PATENT DOCUMENTS 5,558,015 A * 9/1996 Miyashita et al. ............. 100/50
6,994,541 B2 * 2/2006 Chung et al. ................ 425/385
7,204,686 B2 * 4/2007 Chung et al. ................ 425/385

* cited by examiner

*Primary Examiner*—Yogendra Gupta
*Assistant Examiner*—Maria Veronica D Ewald
(74) *Attorney, Agent, or Firm*—Christensen O'Connor Johnson Kindness PLLC

(57) ABSTRACT

A uniform pressing apparatus includes upper and lower pressing units and a mold. The lower pressing unit includes a supporting container, a pressure equalizing liquid received within an upwardly opening accommodating space in the container, and pressurizing equipment including a piston member extending into the accommodating space and operable to push the pressure equalizing liquid upwardly in an axial direction toward a substrate disposed on an annular top surface of the container. The upper pressing unit is movable to allow for contact between the mold and the substrate. Subsequently, the piston member is moved to press the substrate against the mold.

6 Claims, 5 Drawing Sheets

UNIFORM PRESSING APPARATUS FOR USE IN A MICRO-NANO IMPRINT PROCESS

BACKGROUND OF THE INVENTION

1. Field of the Invention

This invention relates to a uniform pressing apparatus, and more particularly to a uniform pressing apparatus for use in a micro-nano fabrication process.

2. Description of the Related Art

Referring to FIG. 1, a conventional uniform pressing apparatus for use in a micro-nano fabrication process includes a support unit 1 for supporting a substrate 6 to be imprinted, a mold 2 disposed on the substrate 6, a holder 3 disposed above the support unit 1, a driving unit 4 for moving the holder 3 vertically, and a uniform pressing member 5 held within the holder 3. The support unit 1 is operable to heat or cool the substrate 6. The uniform pressing member 5 includes a resilient film 501 made of a material capable of resisting high temperatures and high pressures, and a fluid 502 filled within the resilient film 501.

As such, when the driving unit 4 is operated to move the holder 3 downwardly to thereby press the uniform pressing member 5 against the mold 2, the uniform pressing member 5 applies a uniform pressure to the mold 2 so as to perform a nanoimprint operation on the substrate 6.

However, the aforesaid conventional uniform pressing apparatus suffers from the following disadvantages:

(1) The resilient film 501 is required to be made of a material capable of resisting high temperatures and high pressures. Such material is expensive which increases the manufacturing costs of the uniform pressing apparatus.

(2) Due to the use of the uniform pressing member 5 under high-temperature and high-pressure conditions, the service life of the resilient film 501 is short.

(3) The driving unit 4 is typically configured as a hydraulic or pneumatic cylinder, which enables only a limited pressure to be applied to the mold 2. Thus, when the substrate 6 is a thin metal plate, the pressure applied to press the mold 2 against the substrate 6 may be insufficient to provide complete imprinting on the substrate 6.

SUMMARY OF THE INVENTION

The object of this invention is to provide a durable uniform pressing apparatus for use in a micro-nano fabrication process, which can provide a sufficient pressure required for complete imprinting on a substrate and which can be made at a low cost.

Accordingly, a uniform pressing apparatus includes upper and lower pressing units and a mold. The lower pressing unit includes a supporting container, a pressure equalizing liquid received within an upwardly opening accommodating space in the container, and pressurizing equipment including a piston member extending into the accommodating space and operable to push the pressure equalizing liquid upwardly in an axial direction toward a substrate disposed on an annular top surface of the container. The upper pressing unit is movable to allow for contact between the mold and the substrate. Subsequently, the piston member is moved to press the substrate against the mold.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
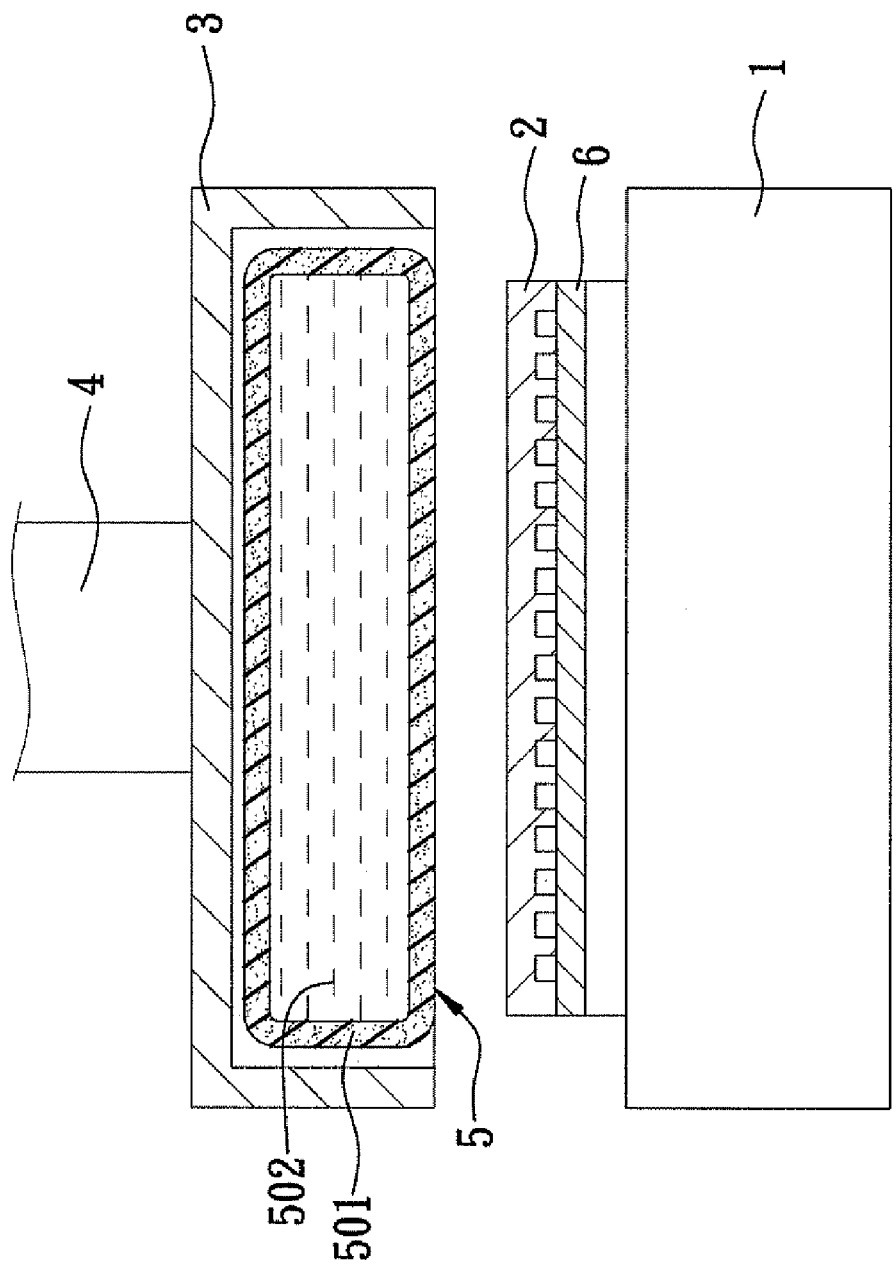
FIG. 1 is a fragmentary schematic sectional view of a conventional uniform pressing apparatus.

Before the present invention is described in greater detail in connection with the preferred embodiments, it should be noted that similar elements and structures are designated by like reference numerals throughout the entire disclosure.

Figure 2:
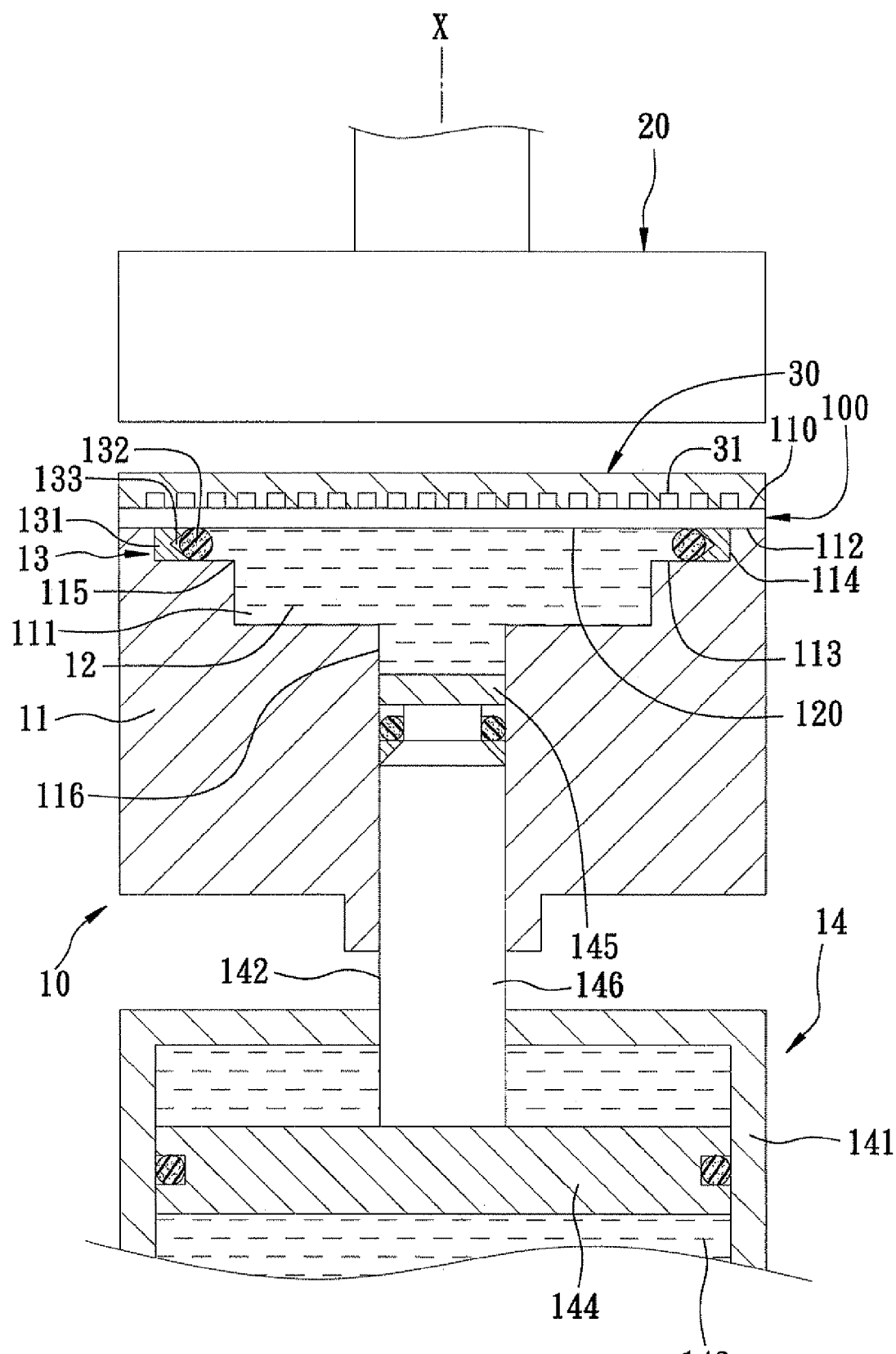
FIG. 2 is a fragmentary schematic sectional view of the first preferred embodiment of a uniform pressing unit for use in a micro-nano fabrication process according to this invention.
Figure 3:
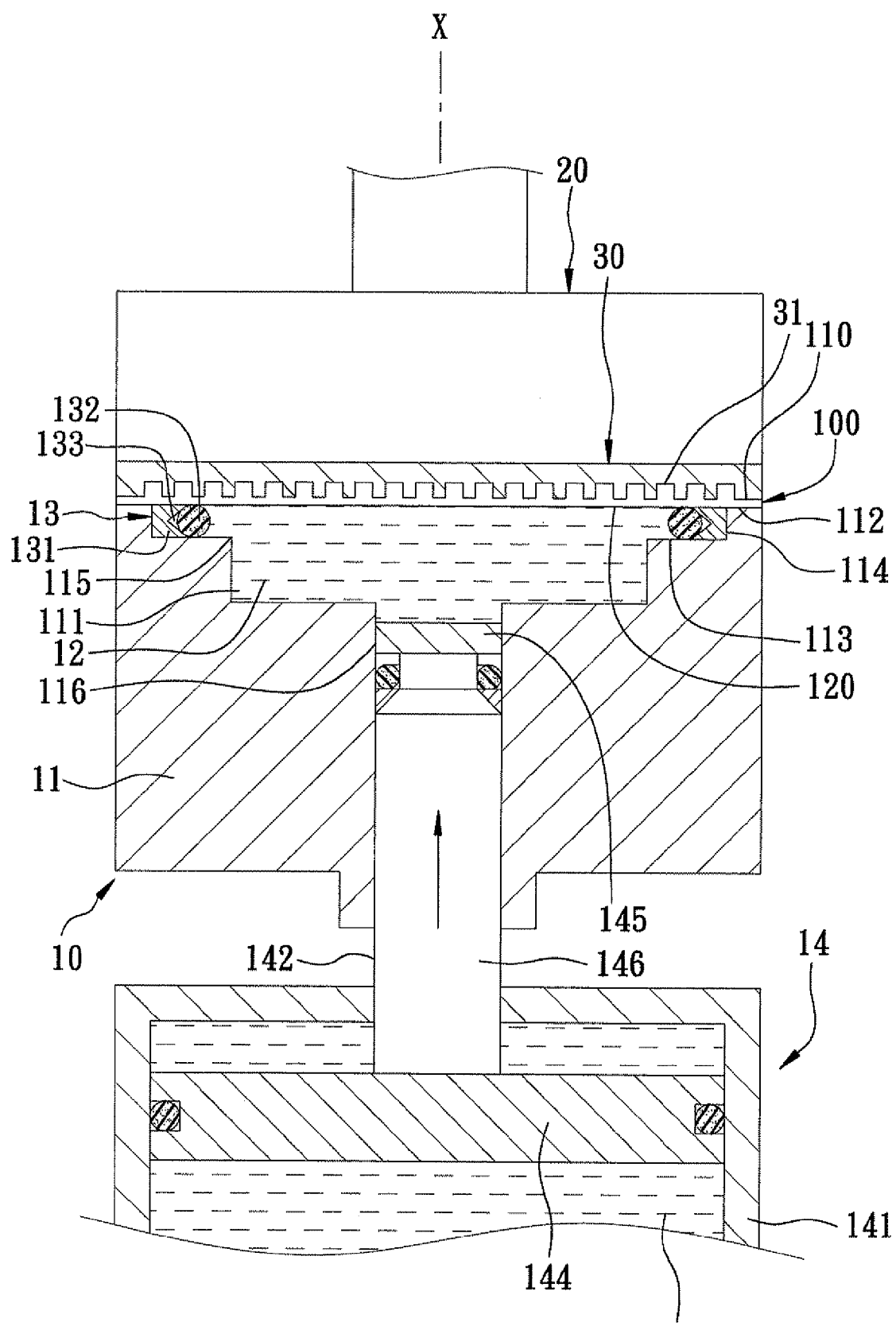
FIG. 3 is a view similar to FIG. 2 but illustrating how a pressure equalizing liquid is pressed against a substrate by a piston member.
Figure 4:
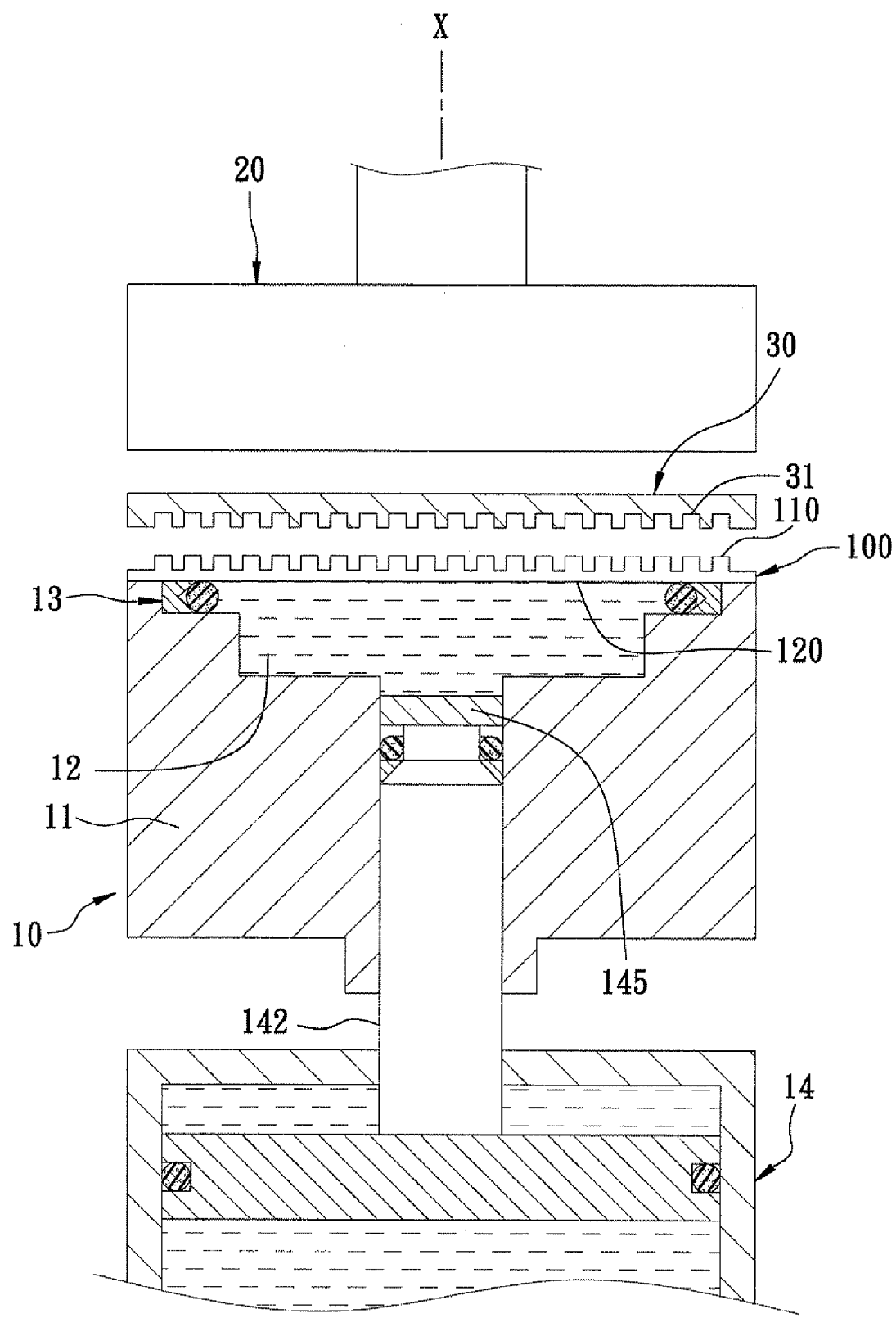
FIG. 4 is a view similar to FIG. 3 but illustrating how a recessed surface is formed on the substrate after a nanoimprint operation is performed on the substrate.

With reference to FIGS. 2, 3, and 4, the first preferred embodiment of a uniform pressing apparatus according to this invention is used to perform a micro-nano fabrication operation on a substrate 100 having opposite top and bottom surfaces 110, 120. The uniform pressing apparatus includes a lower pressing unit 10, an upper pressing unit 20, and a mold 30.

The lower pressing unit 10 includes a supporting container 11, a pressure equalizing liquid 12, a sealing member 13, and pressurizing equipment 14.

The supporting container 11 has an upwardly opening accommodating space 111, an annular top surface 112 defining a top end of the accommodating space 111 and abutting against the bottom surface 120 of the substrate 100, an annular mounting surface 113 disposed below the top surface 112, and a cylindrical shoulder surface 114 connected between an inner periphery of the top surface 112 and an outer periphery of the mounting surface 113. The top end of the accommodating space 111 is sealed by the substrate 100. The accommodating space 111 has a circular cross-section, a large-diameter portion 115 adjacent to the substrate 100, and a small-diameter portion 116 adjacent to the pressurizing equipment 14 and having a diameter smaller than that of the large-diameter portion 115. As such, the large-diameter portion 115 is disposed between the substrate 100 and the small-diameter portion 116.

The pressure equalizing liquid 12 is received within the accommodating space 111 in the supporting container 11.

The sealing member 13 is clamped between the annular mounting surface 113 and the bottom surface 120 of the substrate 100, and includes a metal sealing ring 131 disposed on the annular mounting surface 113 and in contact with the shoulder surface 114, and a rubber sealing ring 132 disposed on the annular mounting surface 113. The metal sealing ring 131 has an inwardly opening annular groove 133 along an inner periphery thereof. The rubber sealing ring 132 engages the groove 133 in the metal sealing ring 131. In this embodiment, the metal sealing ring 131 is made of a copper alloy, such as an alloy of copper and beryllium.

The pressurizing equipment 14 includes a cylinder 141, a piston member 142 extending into the small-diameter portion 116 of the accommodating space 111, and a compressed liquid 143 received within the cylinder 141. The piston member 142 is movable relative to the cylinder 141 and the supporting container 11 along an axial direction (X). The piston member 142 has a large-diameter head 144 disposed movably in the cylinder 141, a small-diameter piston head 145 disposed movably in the small-diameter portion 116 and having a diameter smaller than that of the large-diameter piston head 144, and a connecting section 146 interconnecting fixedly the large-diameter and small-diameter piston heads 144, 145 and extending along the axial direction (X). In this embodiment, the pressurizing equipment 14 is connected to a pressure source (not shown), such as a hydraulic pump. The pressure source is operable to drive the compressed liquid 143 to move the large-diameter piston head 144, such that the small-diameter piston head 145 is moved along the axial direction (X) to thereby press against the pressure equalizing liquid 12.

The mold 30 is placed on the top surface 110 of the substrate 100, and has a forming surface 31 facing the top surface 110 of the substrate 100.

The upper pressing unit 20 is disposed directly above the lower pressing unit 10, and is movable relative to the supporting container 11 along the axial direction (X) to contact the mold 30. The upper pressing unit 20 can heat or cool the mold 30 and the substrate 100 in a known manner.

When the upper pressing unit 20 comes into contact with the mold 30, the upper pressing unit 20 is stopped, and the pressure source is operated to move and press the small-diameter piston rod 145 against the pressure equalizing liquid 12 under automatic control, as shown in FIG. 3. Hence, a uniform upward pressure is applied to press the top surface 110 of the substrate 100 against the forming surface 31 of the mold 30. As a result, a recessed profile is formed on the top surface 110 of the substrate 100, as shown in FIG. 4.

In view of the above, the uniform pressing apparatus of this invention has the following advantages:
(1) The pressure equalizing liquid 12 is used to contact and directly press against the substrate 100 instead of a film utilized in the above-mentioned prior art. Thus, the uniform pressing apparatus of this invention is more durable and inexpensive.
(2) Since the cross-sectional area of the large-diameter piston head 144 is greater than that of the small-diameter piston head 145, a pushing force generated by the small-diameter head 145 against the pressure equalizing liquid 12 is several times that applied to the large-diameter piston head 145 by the compressed liquid 143. As such, a power output required for the pressure source can be reduced significantly. Stated differently, even if the substrate 100 is a metal thin plate, the uniform pressing apparatus of this invention can provide a sufficient pressure to perform a complete imprinting operation on the top surface 110 of the substrate 100.

Alternatively, the mold 30 may be attached fixedly to a bottom surface of the upper pressing unit 20. With such an alternative configuration, under automatic control, during downward movement of the upper pressing unit 20, when the mold 30 comes into contact with the substrate 100, the upper pressing unit 20 is stopped.

Figure 5:
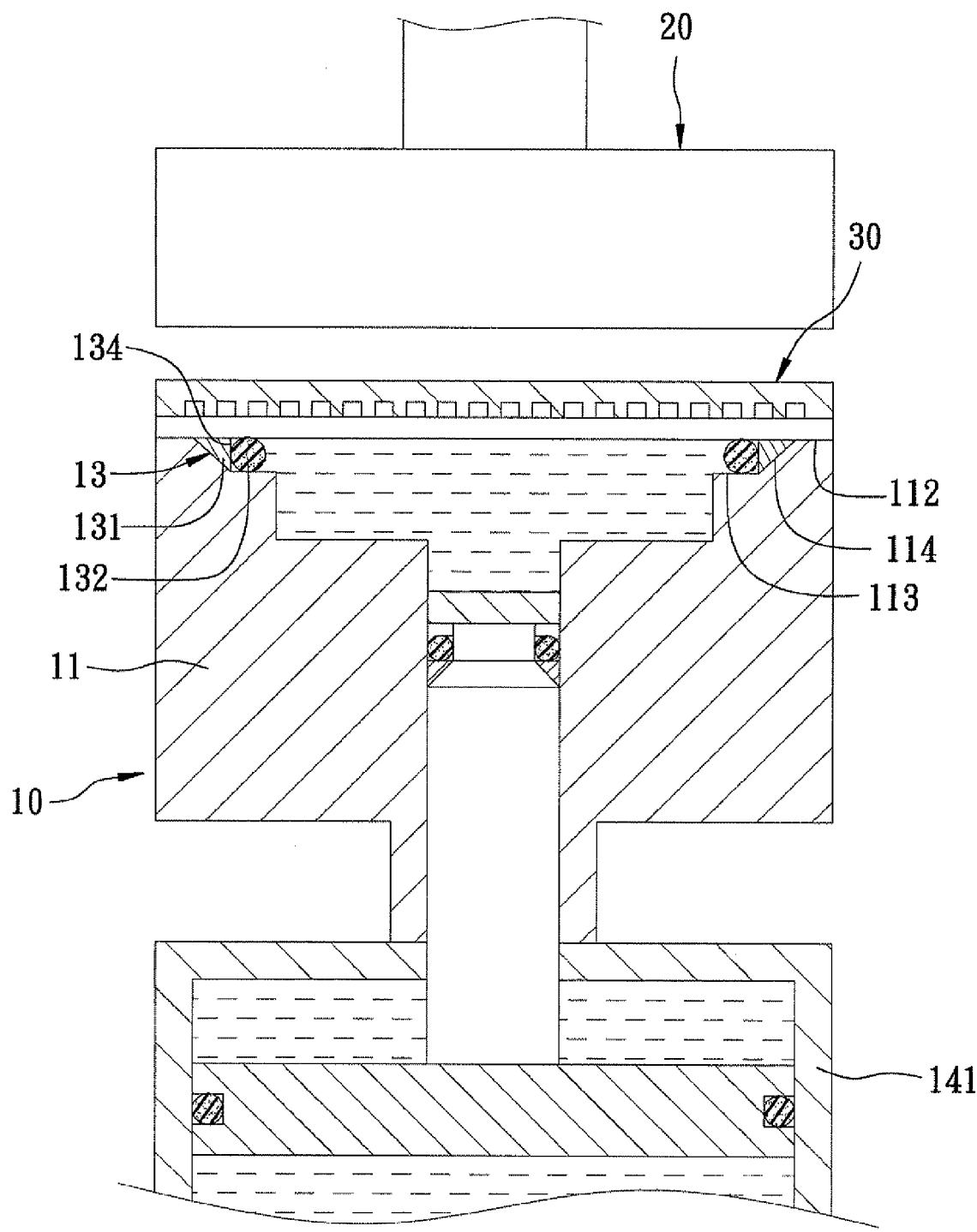
FIG. 5 is a fragmentary schematic sectional view of the second preferred embodiment of a uniform pressing apparatus for use in a micro-nano fabrication process according to this invention.

FIG. 5 shows the second preferred embodiment of a uniform pressing apparatus according to this invention, which is similar in construction to the first preferred embodiment. In contrast to the first preferred embodiment, the cylinder 141 is in contact with and attached fixedly to the supporting container 11, the shoulder surface 114 is frustoconical, and the metal sealing ring 131 is disposed on the shoulder surface 114. In this embodiment, the shoulder surface 114 extends inwardly and downwardly from an inner periphery of the annular top surface 112 to an outer periphery of the mounting surface 113. The metal sealing ring 131 has an annular inner peripheral surface 134 in contact with the rubber sealing ring 132.

With this invention thus explained, it is apparent that numerous modifications and variations can be made without departing from the scope and spirit of this invention. It is therefore intended that this invention be limited only as indicated by the appended claims.

We claim:
1. A uniform pressing apparatus adapted to perform a nanoimprint operation on a substrate, the substrate having opposite top and bottom surfaces, said uniform pressing apparatus comprising:
  a lower pressing unit including
    a supporting container having an upwardly opening accommodating space, and an annular top surface defining a top end of said accommodating space and adapted to abut against the bottom surface of the substrate such that a top end of said accommodating space is sealed by the substrate,
    a pressure equalizing liquid received within said accommodating space in said supporting container, and
    pressurizing equipment including a piston member extending into said accommodating space in said supporting container and operable to push said pressure equalizing liquid upwardly in an axial direction;
  an upper pressing unit disposed directly above said lower pressing unit and movable relative to said supporting container of said lower pressing unit; and
  a mold adapted to be disposed on the top surface of the substrate and having a forming surface adapted to allow the top surface of the substrate to be pressed thereagainst by said lower pressing unit.

2. The uniform pressing apparatus as claimed in claim 1, wherein said supporting container further has an annular mounting surface disposed below said annular top surface, and a cylindrical shoulder surface connected between an inner periphery of said annular top surface and an outer periphery of said annular mounting surface, said lower pressing unit further including a sealing member disposed on said annular mounting surface, said sealing member including a metal sealing ring disposed on said annular mounting surface and in contact with said shoulder surface, and a rubber sealing ring disposed on said annular mounting surface, said metal sealing ring having an inwardly opening annular groove along an inner periphery thereof, said rubber sealing ring engaging said groove in said metal sealing ring.

3. The uniform pressing apparatus as claimed in claim 1, wherein said supporting container further has an annular mounting surface disposed below said annular top surface, and a frustoconical shoulder surface extending inwardly and downwardly from an inner periphery of said annular top surface to an outer periphery of said annular mounting surface, said lower pressing unit further including a sealing member, said sealing member including a metal sealing ring disposed on said shoulder surface, and a rubber sealing ring disposed on said annular mounting surface, said metal sealing ring having an annular inner peripheral surface in contact with said rubber sealing ring.

4. The uniform pressing apparatus as claimed in claim 1, wherein said accommodating space in said supporting container has a circular cross-section, a small-diameter portion, and a large-diameter portion having a diameter greater than that of said small-diameter portion and adapted to be located between the substrate and said small-diameter portion, said piston member of said pressurizing equipment extending into said small-diameter portion of said accommodating space.

5. The uniform pressing apparatus as claimed in claim 4, wherein said pressurizing equipment includes a cylinder, a compressed liquid received within said cylinder, said piston member being movable relative to said cylinder in said axial direction and having a large-diameter piston head disposed movably in said cylinder, and a small-diameter piston head disposed movably in said small-diameter portion of said accommodating space and having a diameter smaller than that of said large-diameter piston head.

6. The uniform pressing apparatus as claimed in claim 5, wherein said piston member further has a connecting section interconnecting fixedly said large-diameter and small-diameter piston heads.

* * * * *